(12) United States Patent
Grönroos et al.

(10) Patent No.: US 7,636,437 B2
(45) Date of Patent: Dec. 22, 2009

(54) TELESCOPIC STRUCTURE FOR A TELEPHONE APPARATUS

(75) Inventors: Mika Juhani Grönroos, Kaarina (FI); Aulis Juhani Perttula, Salo (FI); Ilpo Kalevi Kauhaniemi, Vantaa (FI); Antti Tapio Rönkkö, Espoo (FI); Pertti Ensio Savolainen, Halikko (FI); Jari Martti Suutari, Halikko (FI)

(73) Assignee: Nokia Corporation, Espoo (FI)

( * ) Notice: Subject to any disclaimer, the term of this patent is extended or adjusted under 35 U.S.C. 154(b) by 428 days.

(21) Appl. No.: 11/458,708

(22) Filed: Jul. 20, 2006

(65) Prior Publication Data

US 2006/0251244 A1    Nov. 9, 2006

Related U.S. Application Data

(63) Continuation of application No. 09/842,563, filed on Apr. 25, 2001, now Pat. No. 7,231,039.

(30) Foreign Application Priority Data

Apr. 28, 2000   (FI) ................... 20001008

(51) Int. Cl.
*H04M 1/00*     (2006.01)
*H04M 9/00*     (2006.01)
(52) U.S. Cl. .............. 379/428.02; 379/428.01; 379/433.01; 379/428.03
(58) Field of Classification Search ............ 379/428.01, 379/428.02, 428.03, 433.01, 433.12, 433.13; 455/575.1, 575.4, 90.3
See application file for complete search history.

*Primary Examiner*—Tuan D Nguyen
(74) *Attorney, Agent, or Firm*—Perman & Green LLP

(57) ABSTRACT

A telephone apparatus includes a body part and a sleeve-like grip part mounted to the body part for longitudinal slidable movement between a retracted position and an extended position. Mechanically coupled to the body part and the grip part there is a spring for effecting the longitudinal slidable movement. A locking mechanism is provided for detachably locking the body part and the grip part into the retracted position. There is also a user-actuatable releasing actuator for releasing the locking mechanism. The releasing actuator is located within the grip part.

31 Claims, 9 Drawing Sheets

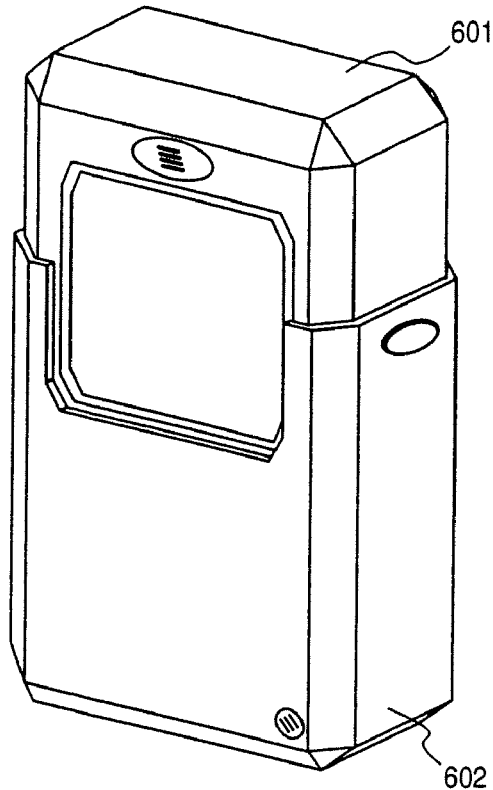
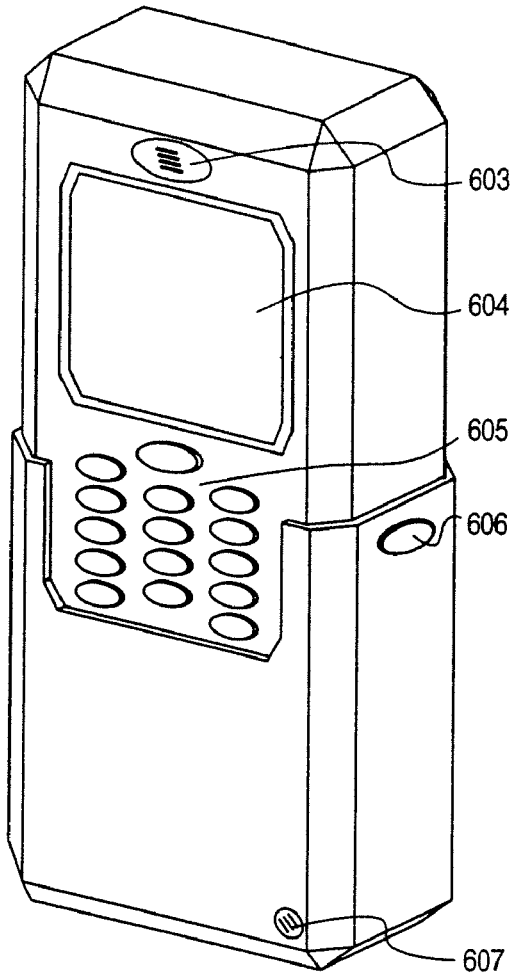
Fig. 6a    Fig. 6b
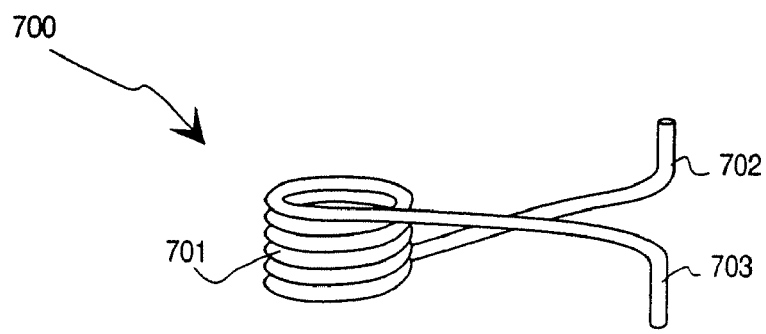
Fig. 7

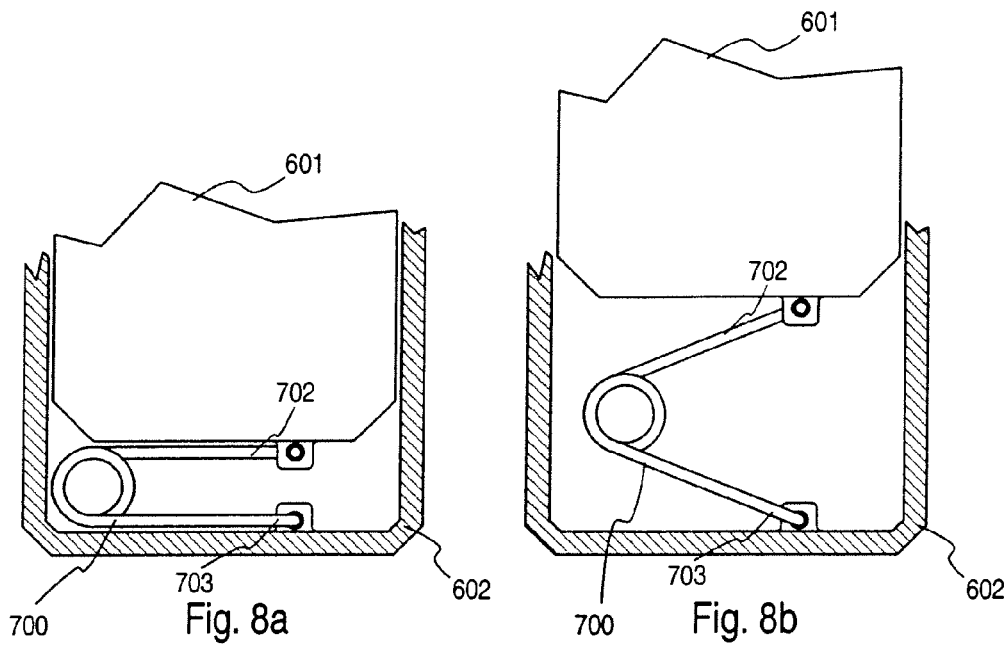
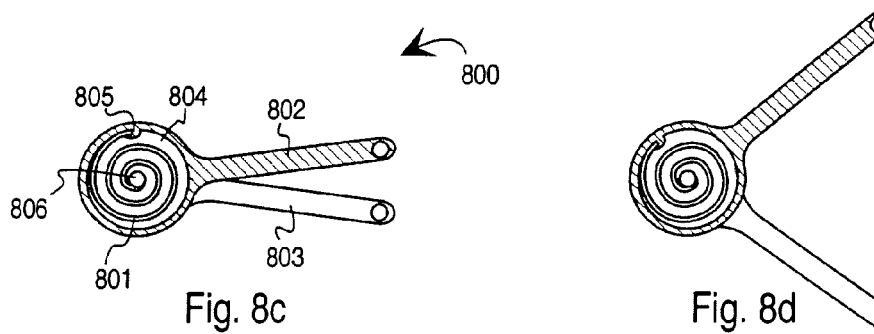
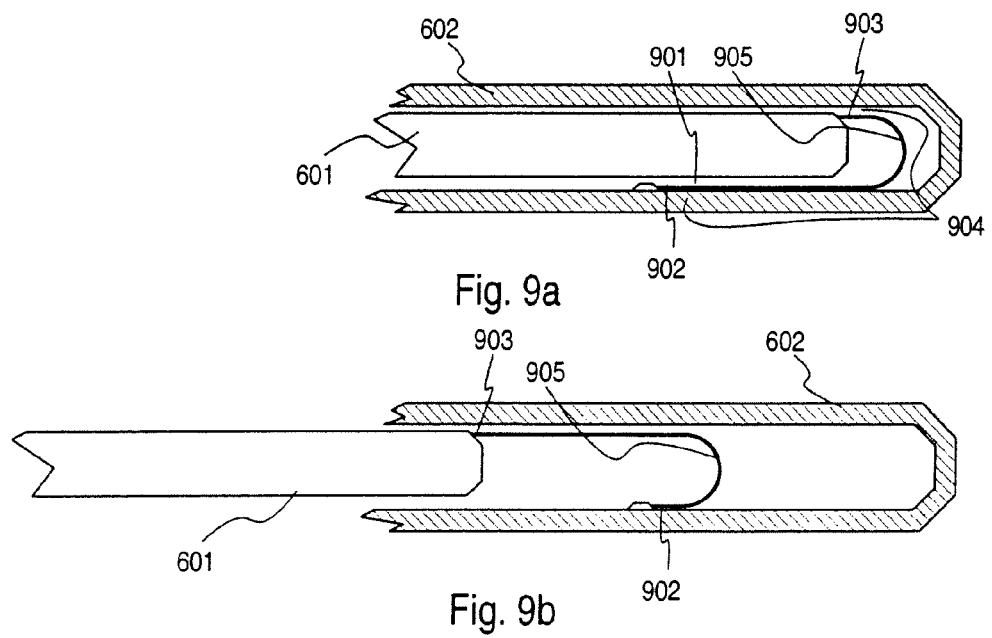

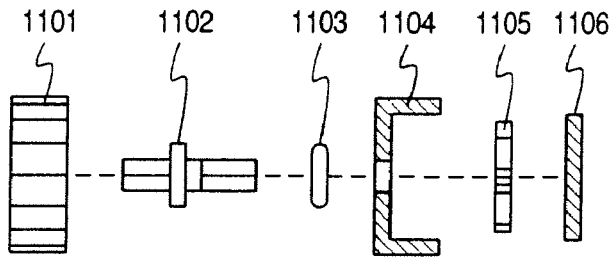
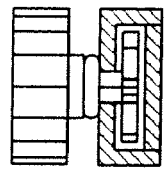
Fig. 11a     Fig. 11b
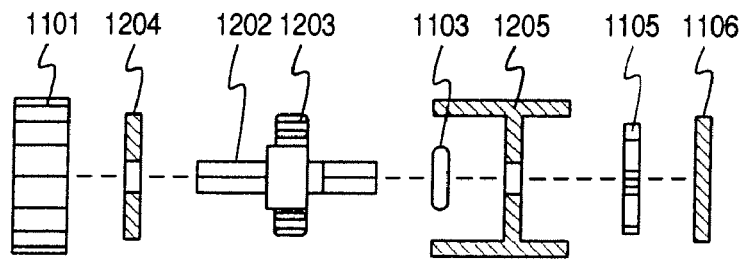
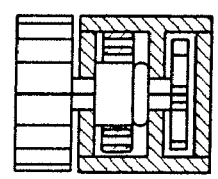
Fig. 12a     Fig. 12b
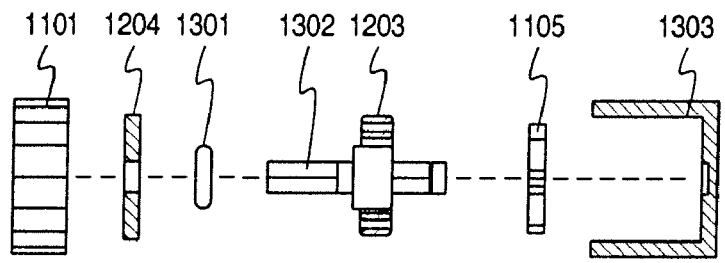
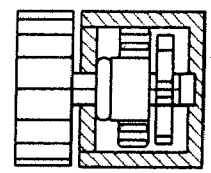
Fig. 13a     Fig. 13b
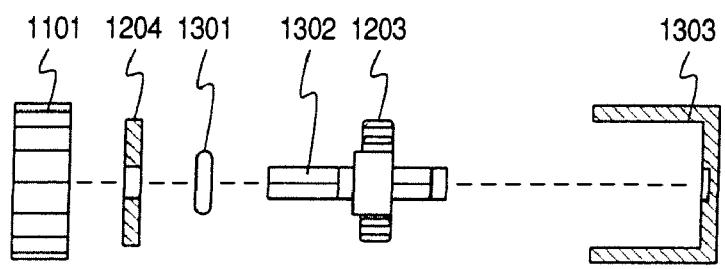
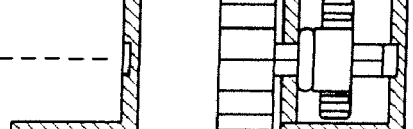
Fig. 13c     Fig. 13d

TELESCOPIC STRUCTURE FOR A TELEPHONE APPARATUS

CROSS-REFERENCE TO RELATED APPLICATIONS

This application is a continuation of, claims priority from and the benefit of U.S. application Ser. No. 09/842,563 filed 25 Apr. 2001, now U.S. Pat. No. 7,231,039, the disclosure of which is incorporated by reference herein in its entirety.

TECHNOLOGICAL FIELD

The aspects of the invention relate in general to the electromechanical structure of a telephone apparatus. Especially the invention relates to the selection, form and mutual arrangement of the structural components of a telescopically extendable telephone apparatus. The term telephone apparatus is understood to mean a piece of communication equipment a normal operational position of which is one where a human user holds the device in question with one hand against the side of his head.

BACKGROUND OF THE INVENTION

Telescopic or other extendable structures are provided for telephone apparatuses in order to make the device physically small in a transport position and to bring the loudspeaker and microphone thereof close enough to the ear and mouth respectively of a human user in an operational position. FIGS. 1 to 5b illustrate some prior art structures of this kind. The mobile telephone 100 of FIG. 1 comprises a body part 101 and a microphone arm 102 which is rotatably mounted to one corner of the body part. In the operational position shown in FIG. 1 the distance between the loudspeaker 103 at the top of the body part and the microphone 104 at the distant end of the microphone arm approximates the distance between the ear and mouth of a typical human user. The mobile telephone 200 of FIG. 2 comprises a body part 201 and a hinged flip cover 202 which in a transport position covers a keypad 203 and in the operational position shown in FIG. 2 brings the microphone 204 at the distant end thereof far enough from a loudspeaker 205 in the body part. The mobile telephone 300 in FIG. 3 resembles functionally that 200 of FIG. 2, but the cover part 302 slides on a pair of sliding rails with respect to the body part 301 instead of rotating around a hinge. Keypad 303, microphone 304 and loudspeaker 305 serve same functions as in FIG. 2.

FIG. 4 illustrates a mobile telephone 400 which comprises a lower body part 401 and an upper body part 402. The latter houses a loudspeaker 403, a display 404 and a limited number of keys in a quickfire keypad 405. The lower part houses a full (alpha)numerical keypad 406, a microphone 407 and an antenna 408. An exemplary structure of this kind is known e.g. from the Finnish registrated design application number 285/97. FIGS. 5a and 5b illustrate another known telescopic structure for a mobile telephone which differs from that of FIG. 4 in the mutual arrangement of the functional components. The telephone consists of an upper part 501 and a lower part of which the upper part houses an integral antenna 503, a radio transceiver 504, a loudspeaker 505, a display 506, a smart card reader 507 and a small keypad 508. The lower part comprises an extended keypad 509, a battery pack 510 and a charging connector 512 for coupling the telephone to a battery charger (not shown). The microphone 511 is located in the upper part, but it could also be in the lower part. The structure of FIGS. 5a and 5b is known e.g. from the European patent publication number EP 0 944 219.

A still further prior art extendable structure for a portable telephone is known from the European patent publication number EP 0414 365. The structure comprises a housing having a main body and an extending sleeve-like portion mounted for longitudinal slidable movement between a retracted position when not in use and an extended position for use. In a preferred arrangement, the earphone is present in the main body and the microphone is in the extending portion. The telephone includes a plurality of buttons or keys which can be selectively actuated for operating the telephone. In one embodiment the extending portion is adapted to conceal selected ones of the buttons or keys when it is in the closed position to prevent accidental actuation of these buttons or keys.

There are various disadvantages associated with the known extendable telephone structures. In many cases the limited thickness of the extendable parts gives a shaky appearance to the structure in the extended configuration. Bringing the parts from the retracted configuration to the extended configuration is often somewhat complicated and requires the use of two hands. Electrical connections between the structural entities often necessitate the use of visible conductors: for example the structure of FIG. 3 comprises a pair of exposed conductor tracks at the lower side of the sliding cover 302. The visibility of electrical conductors tends to irritate users, because uninformed people are afraid of getting electric shocks.

SUMMARY OF THE INVENTION

An extendable structure for a telephone apparatus so that the drawbacks of prior art arrangements are avoided. It is also an object of the invention to provide an extendable structure for a telephone apparatus which has a solid and reliable appearance also in the extended configuration. Another object of the invention is to make it easy to bring the extendable telephone structure to the extended configuration with one hand. A further object of the invention is to provide an extendable structure for a telephone apparatus where the electrical connections between parts are not immediately exposed.

The advantages of the invention are achieved by providing a body part and a grip part where the grip part has a sleeve-like form, is mounted for longitudinal slidable movement with respect to the body part and is extensive enough for a user to hold the telephone apparatus firmly by the grip part. The advantages of the invention are further achieved by properly selecting and locating the parts that control the longitudinal movement of the grip part.

A telephone apparatus according to the invention comprises
  a body part
  a sleeve-like grip part mounted to the body part for longitudinal slidable movement between a retracted position and an extended position
  mechanically coupled to the body part and the grip part, a movement-effecting mechanism for effecting the longitudinal slidable movement
  a locking mechanism for detachably locking the body part and the grip part into the retracted position and
  a user-actuatable releasing actuator for releasing the locking mechanism.

It is characteristic to a telephone apparatus according to the invention that the releasing actuator is located within the grip part.

In the context of the present patent application the term sleeve-like is taken to describe an essentially tubular part designed to fit over another part. In a telephone apparatus according to the invention there is a body part which houses a majority of the functional components of the telephone apparatus, and a sleeve-like grip part which is mounted for longitudinal slidable movement with respect to the body part. In the retracted configuration a certain relatively large portion of the body part is inside the grip part. The body part may be even completely inside the grip part, or a certain portion of the body part may protrude out from one end of the grip part. Extending the telephone apparatus means moving the body part in a longitudinal direction thereof so that a relatively large portion comes out from the sleeve-like grip part. Retracting the telephone apparatus means moving the body part in the opposite longitudinal direction so that it arrives and locks back into the retracted configuration.

In order to make it as easy as possible to pop the telephone apparatus from the retracted configuration to the extended configuration, there is provided a movement-effecting mechanism with a locking arrangement. A releasing switch for the locking arrangement is located in the grip part, preferably at a location where a finger of a human user naturally rests when the user grasps the telephone apparatus for holding it in a normal operational position. A simple actuation of the releasing switch releases the locking mechanism so that the movement-effecting mechanism is free to move the body part partially out of the grip part into the extended configuration.

The movement-effecting mechanism is typically a spring-loaded mechanism preferably built around either a torsion spring or a clockwork spring. In the torsion spring based embodiments one end of the torsion spring is mechanically coupled to the body part and another end thereof is mechanically coupled to the grip part. In the retracted configuration the torsion spring is in an excited state so that a springback force tries to push the body part out of the grip part into the extended configuration. If the grip part comprises a closed end and the torsion spring is located inside the grip part near the closed end, it is hidden from the eyes of users and protected from environmental hazards such as fouling and corrosion. In the clockwork spring based embodiments the spring is preferably encapsulated into an enclosure which constitutes a part of either the body part or the grip part. One end of the spring is mechanically coupled to a gear wheel which engages with a mechanical gear arrangement between the body part and the grip part. Again in the retracted configuration the spring is in an excited state so that a springback force tries to rotate the gear wheel. The mechanical gear arrangement transforms the rotational movements of the gear wheel into longitudinal movements of the body part in relation to the grip part.

Alternatives to spring-loaded movement-effecting mechanisms comprise e.g. motorized mechanisms where an electric motor generates the relative sliding movement between the grip part and the body part. If the electric motor has the characteristic feature of providing a large static torsional force that keeps the axle of the motor from rotating when not intentionally operated, the motor itself may be used as the locking mechanism in which case the releasing switch is just the on/off switch for the motor. Also such electrical motors exist where an integrated brake arrangement provides the mentioned static torsional force, in which case the releasing switch is both the releasing switch for the brake arrangement and the switch-on switch for the rotational movement of the motor. A motor can naturally be used in association with such a completely mechanical, separate locking arrangement which was described above in the context of spring-loaded movement-effecting mechanisms.

Another alternative for the movement-effecting mechanism is the use of magnets. If one wishes to use a magnetic force to effect a similar unidirectional loading as in the spring-loaded embodiments, it suffices to place a first magnet in the grip part and a second magnet in the body part so that in the retracted configuration the similarly named magnetic poles of the first and second magnets face each other at a close distance. The magnets may be permanent magnets, or at least one of them may be an electromagnet.

From the viewpoint of the electrical operation of a telephone apparatus it is advantageous to place some functional components also into the grip part. Examples of such components comprise microphones and connectors for providing an electric interface to auxiliary devices. An advantageous way of realizing the necessary electric interconnections between the body part and the grip part is to use a so-called flex or flexible printed circuit board where a number of conductors run on the surface of a thin dielectric foil. One part of the flex is attached to the grip part and another part of the flex is attached to the body part. Between the attached parts there is a portion of the flex which is not attached to anywhere and which is long enough in one direction to allow the body part and grip part to move between the retracted configuration and the extended configuration. The sleeve-like form of the grip part serves to hide the flex from the eyes of users as well as from potential environmental hazards.

In spring- or magnetically loaded embodiments the longitudinal movement of the body part and grip part between the retracted and extended configurations is preferably further controlled by a mechanical damper which absorbs a part of the spring power in order to prevent the body part from clashing abruptly and loudly into the extended position. Damping the movement serves to lessen the mechanical stress and wear to the components. Additionally it helps to create an elegant overall appearance for the telephone apparatus.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 6a and 6b illustrate a telephone device according to an embodiment of the invention, FIG. 7 illustrates a torsion spring which is advantageously used in association with the invention, FIGS. 8a and 8b illustrate the use of a torsion spring to implement an aspect of the invention, FIGS. 8c and 8d illustrate a mechanism which is an alternative of a torsion spring, FIGS. 9a and 9b illustrate the use of a flex to implement an aspect of the invention, FIGS. 10a and 10b summarize certain aspects of an advantageous embodiment of the invention, FIGS. 11a and 11b illustrate a damper arrangement, FIGS. 12a and 12b illustrate a damper and spring arrangement, FIGS. 13a and 13b illustrate another damper and spring arrangement, FIGS. 13c and 13d illustrate another damper and spring arrangement, FIGS. 14a and 14b summarize certain aspects of another advantageous embodiment of the invention, FIGS. 15a and 15b summarize certain aspects of another advantageous embodiment of the invention.

FIGS. 1 to 5*b* were described in association with the description of prior art, so the following discussion of the invention in light of its advantageous embodiments focuses on FIGS. 6*a* to 17*b*. Like parts in the drawings are shown with the same reference designators.

DETAILED DESCRIPTION OF THE INVENTION

Figure 1:
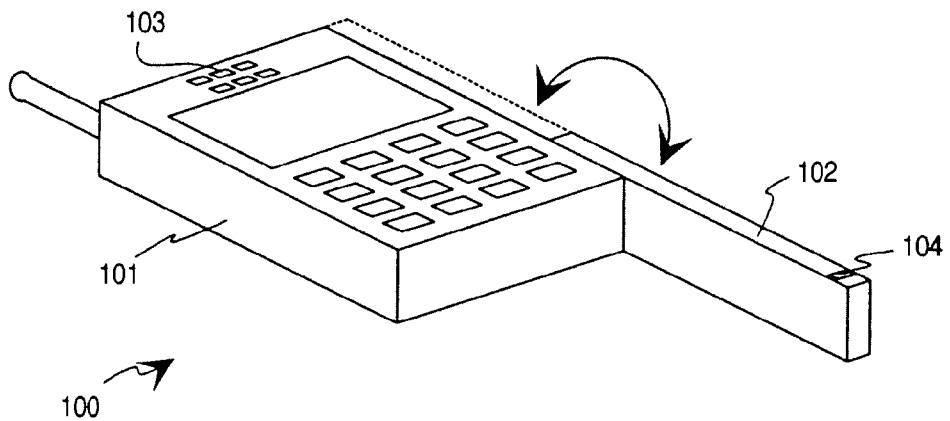
FIG. 1 illustrates a known extendable telephone structure.
Figure 2:
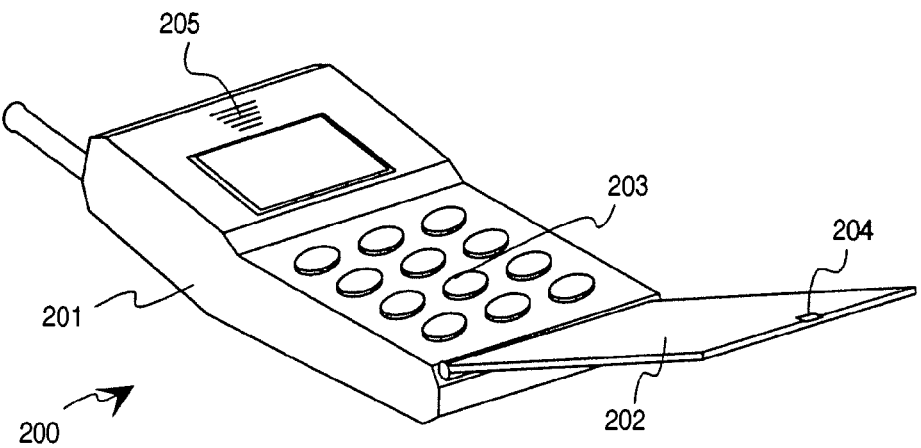
FIG. 2 illustrates another known extendable telephone structure.
Figure 3:
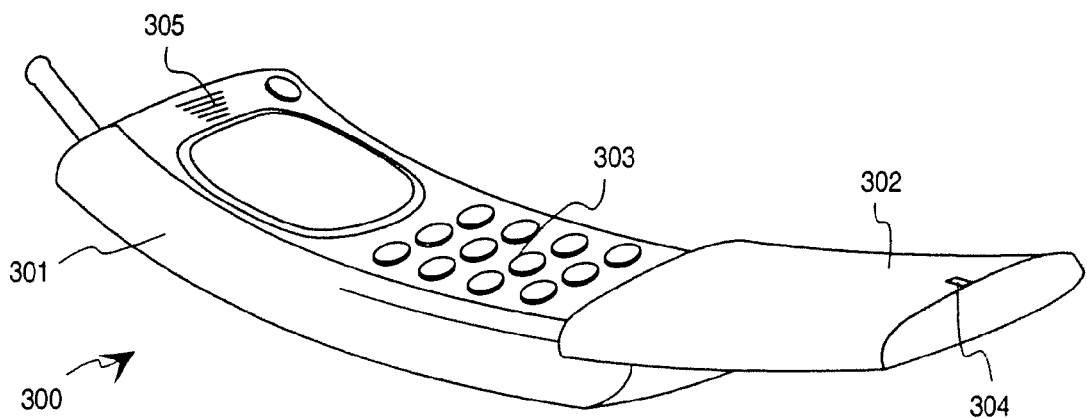
FIG. 3 illustrates another known extendable telephone structure.
Figure 4:
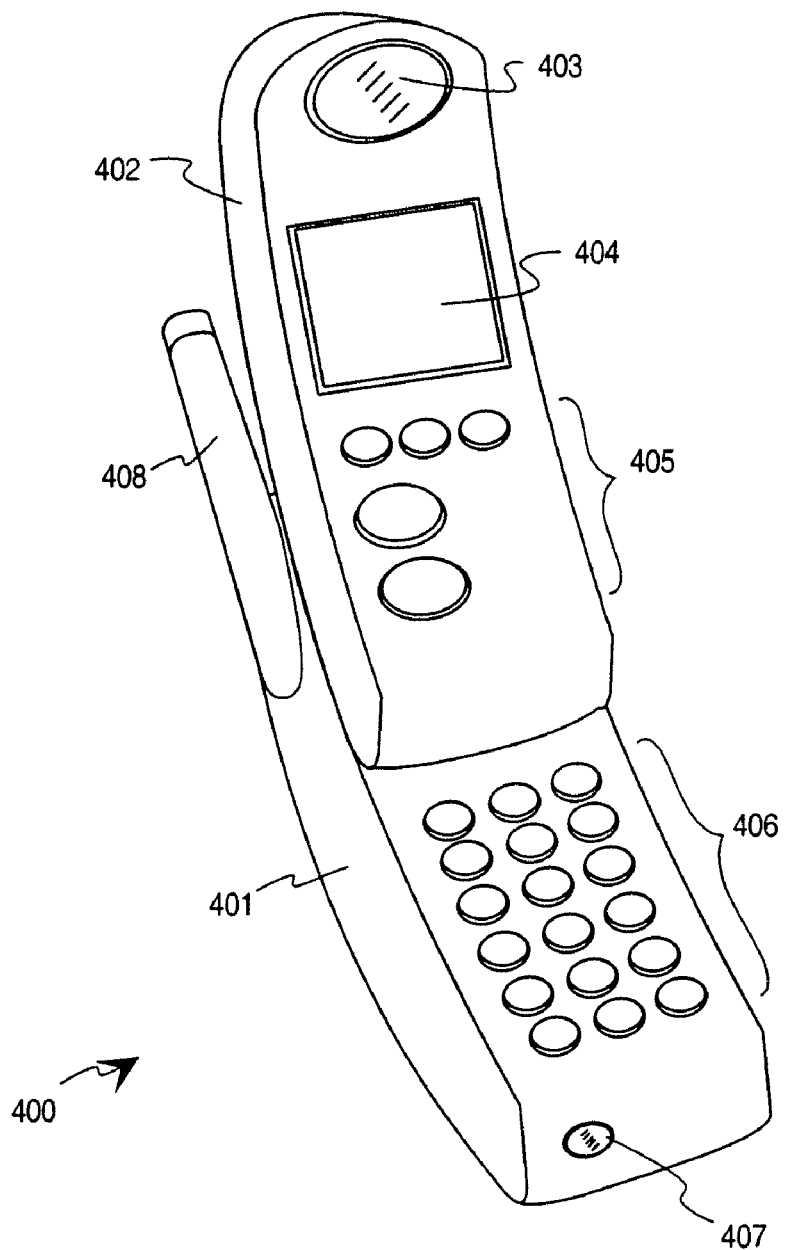
FIG. 4 illustrates another known extendable telephone structure.

FIG. 6*a* illustrates schematically a telephone device according to an advantageous embodiment of the invention in a retracted configuration where a relatively large portion of a body part 601 is within a sleeve-like grip part 602. FIG. 6*b* illustrates the same telephone device in an extended configuration where the body part has been moved into a longitudinal direction (upwards in the orientation shown in the drawings) so that a larger portion thereof has come out from the grip part. FIG. 6*b* shows the exemplary locations of a loudspeaker 603, a display 604 and a keypad 605 within the body part, and the exemplary locations of a locking mechanism release button 606 and a microphone 607 within the grip part.

We may define that the sleeve-like grip part 602 is generally limited by front and back surfaces, two parallel side surfaces and a bottom surface. The front surface is the one which covers the keypad 605 in the retracted configuration, and the back surface is the one which is parallel to the front surface and not visible in FIGS. 6*a* and 6*b*. The two side surfaces are those mutually parallel surfaces which are essentially perpendicular to the front and back surfaces; in FIGS. 6*a* and 6*b* the locking mechanism release button 606 is located on one of the side surfaces. The bottom surface is the one which is perpendicular to the front, back and side surfaces and not visible in FIGS. 6*a* and 6*b*.

The location of the loudspeaker 603 and microphone 607 dictates that a normal operational position of the telephone apparatus in the extended configuration of FIG. 6*b* is such where the front surface of the grip part 602 is against the cheek of a user and the top end of the telephone apparatus points up and backwards. In order to hold the telephone apparatus in the normal operational position it is natural for a human user to grasp the telephone apparatus by the grip part with one hand so that one side surface rests against the thumb and palm. Simultaneously the tips of the other fingers rest on the other side surface.

The location of the locking mechanism release button 606 which is shown in FIGS. 6*a* and 6*b* is especially advantageous, since regardless of whether the user likes to hold the telephone apparatus in his right or left hand, the release button is always very conveniently placed in order for immediate actuation either with the thumb or with one of the other fingers. The user never has to use more than one hand to release the locking mechanism, and he may actuate the release button even without changing the natural position of the fingers of that hand.

The invention does not place limitations to the mechanical implementation of the locking mechanism itself. Typically the body part 601 comprises a recess, and the release button 606 is mechanically coupled to a spring-loaded protrusion which fits into the recess when the telephone apparatus is in its retracted configuration and the release button is not pressed. Pressing the release button counteracts the spring-loading and causes the protrusion to retract from the recess. The body part may comprise another recess lower down near the end which is inside the grip part if the same locking mechanism is to be used to lock the telephone apparatus also into the extended position.

FIGS. 6*a* and 6*b* only disclose a single release button on one side of the grip part. The releasing mechanism may as well be constructed so that it comprises at least two release buttons. If exactly two release buttons are used, it is advantageous to place them on approximately the same level in the vertical direction shown in FIGS. 6*a* and 6*b* but on opposite side surfaces of the grip part. If we continue with the assumption of a typical grasping hold used by a human user, placing one release button on each side surface would bring one of the release buttons within easy reach of the thumb and the other release button within easy reach of the tips of the other fingers. Additionally the most natural squeezing action of the holding hand is enough for actuating the release buttons.

The use of at least two release buttons, or more generally release actuators, leaves it to the mechanics designer to decide, whether both (or all) release actuators must be actuated in order to release the locking. From e.g. the technology of car holders for mobile telephones there are known mechanical arrangements which comprise two release buttons on opposite surfaces of the holder but where it suffices to press only one of the buttons to actually release the mobile telephone from its holder. The present invention does not place limitations to the selection of strategy in this matter.

FIG. 7 illustrates a torsion spring 700 which consists of a helically wound part 701 the ends of which extend to form two torsion arms 702 and 703. The torsion spring 700 is made by bending from a piece of spring steel wire or other suitably resilient material. FIGS. 8*a* and 8*b* show how this kind of a spring may be used to provide the spring force which pushes a telephone apparatus according to an embodiment of the invention from the retracted configuration (FIG. 8*a*) to the extended configuration (FIG. 8*b*). FIGS. 8*a* and 8*b* are partial cut-out diagrams where the bottom parts of the body part 601 and grip part 602 are shown. The torsion spring 700 is located at the closed bottom end of the grip part 602 so that one torsion arm 702 is mechanically coupled to the body part 601 and the other torsion arm 703 is mechanically coupled to the grip part 602. In the retracted configuration of FIG. 8*a* the torsion spring 700 is in an excited state where the spring force resulting from the resiliency of the spring tends to widen the angle between the torsion arms. If the body part 601 is left free to move with respect to the grip part 602, said spring force pushes it upwards (taken the orientation shown in the drawings) until it reaches the extended configuration of FIG. 8*b*. In the extended configuration the torsion spring 700 is either in a relaxed state or at least in a much less excited state than in the retracted configuration.

FIGS. 8*c* and 8*d* show how a spiral spring module 800 can be used instead of a torsion spring as the structural unit which provides the spring force that causes the relative movement of the body part and the grip part. The spiral spring module 800 comprises a spiral spring 801 as well as a first reaction arm 802 and a second reaction arm 803. One end of the first reaction arm 802 expands to form a cylindrical housing 804 which encloses the spiral spring 801 therein. One end (the outer end in the embodiment of FIGS. 8*c* and 8*d*) of the spiral spring 801 is attached to the wall of the cylindrical housing 804 at point 805. One end of the second reaction arm 803 expands to form a circular lid which closes one end of the cylindrical housing 804. A central pin 806 extends from the circular lid to the inside of the cylindrical housing 804. The other end (the inner end in the embodiment of FIGS. 8*c* and 8*d*) of the spiral spring 801 is attached to the central pin 806.

Figures 5A, 5B:
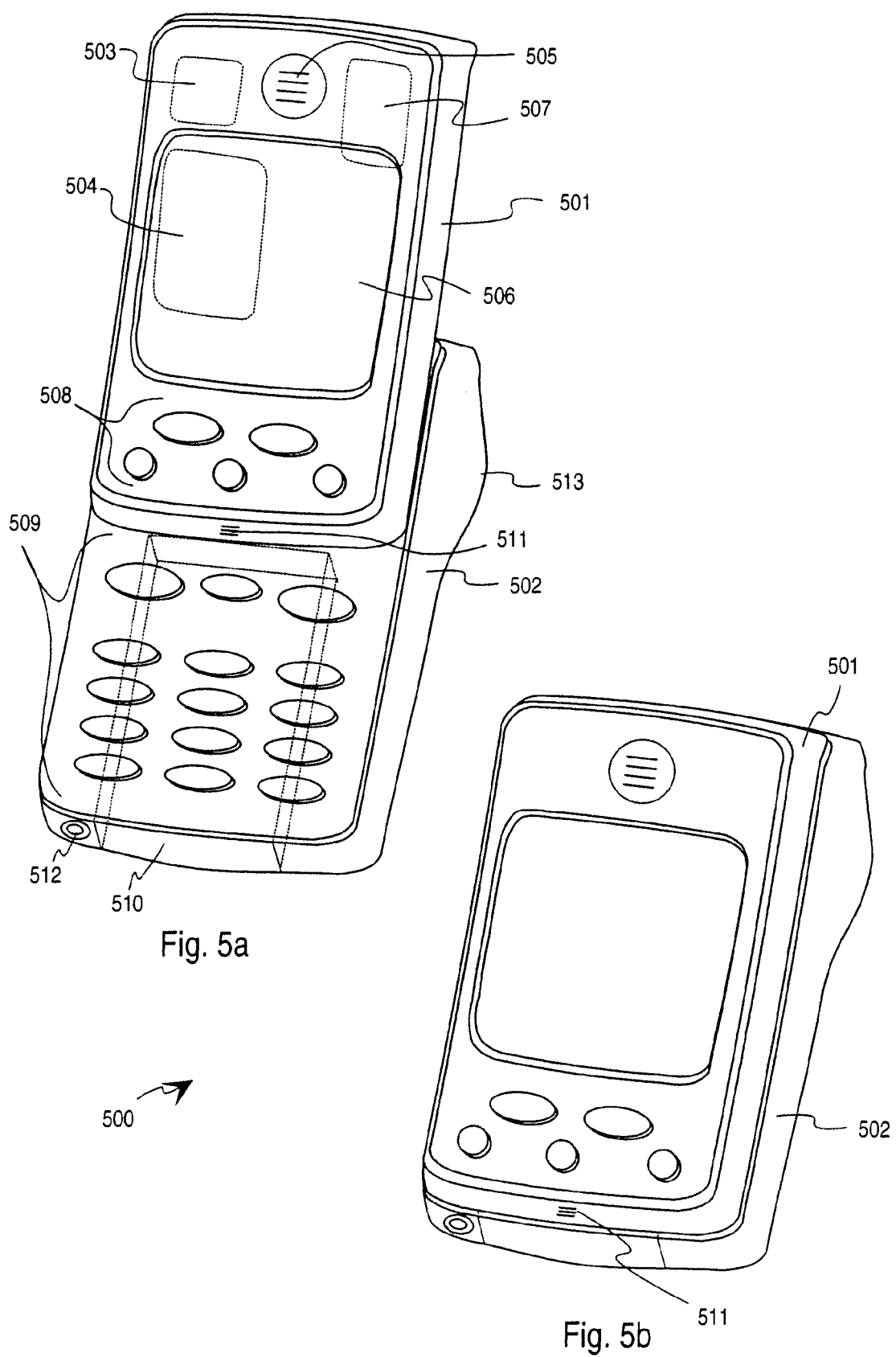
FIGS. 5a and 5b illustrate another known extendable telephone structure.

In the retracted configuration the angle between the reaction arms 802 and 803 is relatively small, and the spiral spring 801 is in an excited state where the spring force tends to increase the angle between the reaction arms 802 and 803. FIG. 8*c* corresponds to the retracted configuration. Correspondingly in the excited configuration illustrated in FIG. 5*d* the angle between the reaction arms 802 and 803 is relatively large, and the spiral spring 801 is either in a relaxed state or at least in a much less excited state than in the retracted configuration. The ends of the first and second reaction arms which are distant from the spring housing can be mechanically coupled to the body part and the grip part respectively, exactly like the first and second torsion arms of the torsion spring described above.

FIGS. 9a and 9b illustrate a way of arranging for an electric connection between a sleeve-like grip part 602 and a body part 601. A flexible flat cable or flexible printed circuit board 901, typically called the flex for short, interconnects the grip part 602 and the body part 601 so that a certain first spot 902 of the flex is attached to the grip part 602 and a certain second spot 903 of the flex is attached to the body part 601. Between said first and second spots there is a free part 904 of the flex which is elongated in the direction coincident with the movement of the body part and not attached to anywhere. The free part of the flex is bent to form a 180 degrees curved section 905. In the retracted configuration of FIG. 9a the curved section 905 is close to the bottom of the grip part 602 and a relatively large portion of the free part lies flat against the inner surface of the grip part between the first spot 902 and the curved section 905. When the body part 601 moves into the extended configuration of FIG. 9b it draws the free part of the flex after it so that in the extended configuration the curved section starts almost immediately from the first spot 902 and most of the free part extends flatly between the curved section 905 and the second spot 903.

Figure 10A:
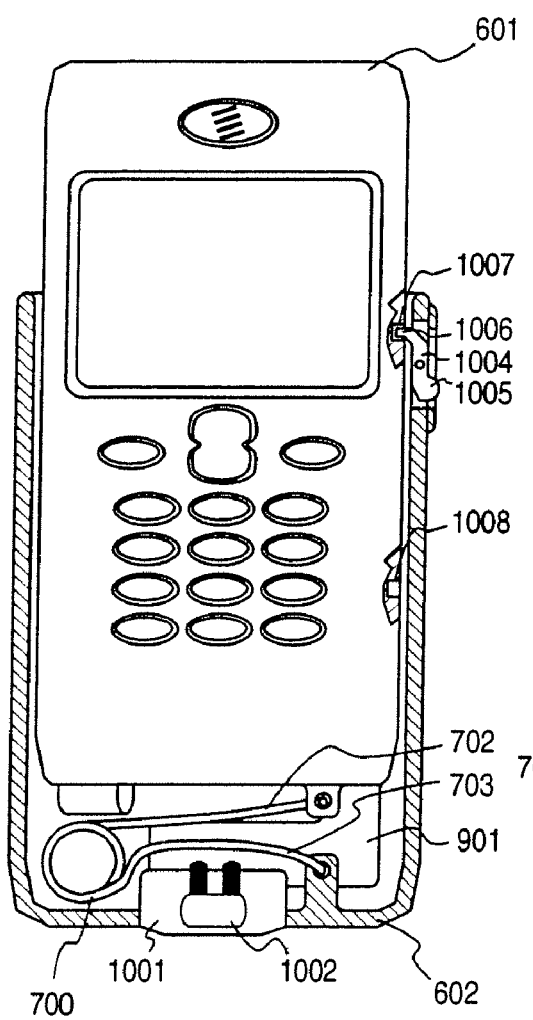
Figure 10B:
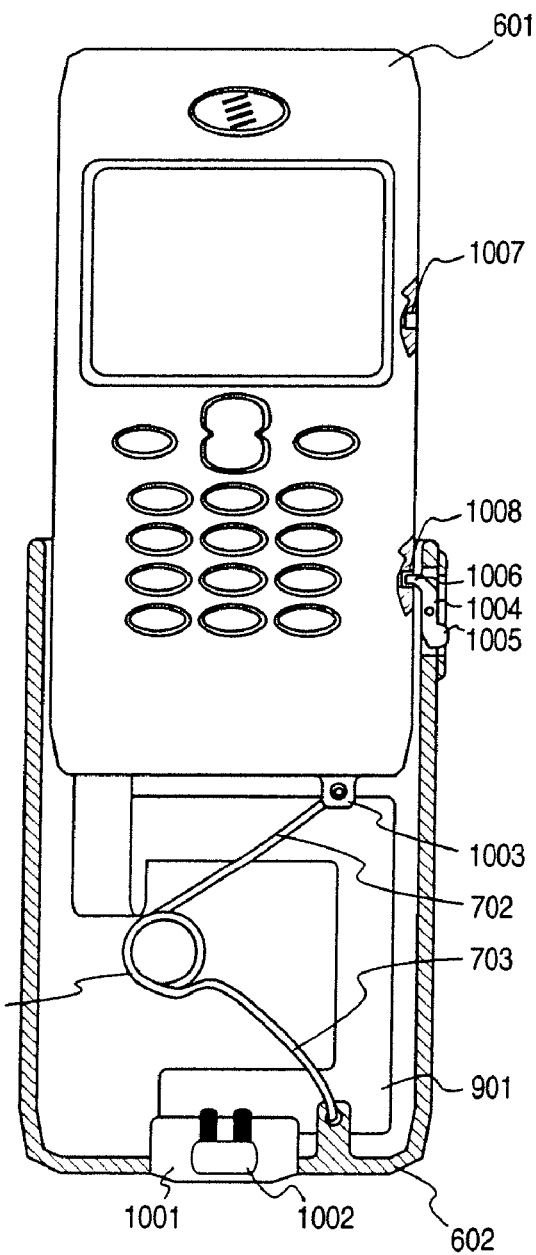

FIGS. 10a and 10b show a telephone apparatus according to an embodiment of the invention where the above-described features are all implemented. The telephone apparatus consists of a body part 601 and a sleeve-like grip part 602 a cutout of which is shown here to reveal certain inner structures therein. In a practical structure the shell or outer cover of the grip part may well consist of a front half and a back half so that FIGS. 10a and 10b correspond to such a structure with the front half of the shell temporarily removed. FIG. 10a shows the telephone apparatus in a retracted configuration and FIG. 10b shows it in an extended configuration.

In FIGS. 10a and 10b the grip part 601 comprises at the bottom thereof a connector 1001 for providing an electromechanical interface between the telephone apparatus and potential auxiliary devices. Likewise at the bottom of the grip part there is a microphone 1002. The electrical connections between the functional components of the body part 601 and said connector 1001 and microphone 1002 go through a P-shaped flex 901 where the lower end of the loop in the P is separated from the stem of the P. The connector 1001 and microphone 1002 are connected to said lower end of the loop in the P; in the arrangement shown here the microphone 1002 is "piggy-backed" on top of the connector 1001 so that the microphone may be either directly connected to the flex 901 or there may be specific connecting arrangements in the connector 1001 which implement the coupling between the microphone 1002 and the flex 901. The loop of the P in the P-shaped flex 901 is attached to the inner surface of the grip part 602 e.g. by glueing. The stem of the P constitutes the free part of the flex 901 so that the upper end thereof is attached to the grip part 602 and the lower end is bent 180 degrees upwards and attached to the body part 601.

The torsion spring 700 is located at the bottom of the grip part 602 in the essentially closed space left free under the bottom of the body part 601. The first torsion arm 702 is attached to the body part 601 and the second torsion arm 703 is bent so that it negotiates its way around the connector 1001 and is attached to the grip part 602. Despite of the limited space available at the bottom of the grip part it is important to have rather long torsion arms in the torsion spring 700 in order to enable a long enough movement for the body part 601.

The attachment of the first torsion arm 702 to the body part 601 is worth some consideration. An advantageous principle for the overall mechanical structure of the body part is such where a certain core or inner support structure forms the basis onto which the other main structural components like printed circuit board(s) and outer covers are attached. In an advantageous embodiment the core is a generally flat component lying parallel with the front and back surfaces of the body part and extending through the body part essentially along the central plane thereof. The surface of the core onto which a printed circuit board is to be attached may comprise elevated ridges that define separate compartments for certain components on that side of the board which comes against the core. If the core or at least the inner surfaces of said compartments are made electrically conductive, the core serves simultaneously as the electromagnetic interference shield for those components. Because the core has such a central role as a support structure, it is advantageous that the first torsion arm 702 is mechanically coupled directly to the core, i.e. the core comprises an attachment point 1003 for the end of the first torsion arm 702.

The attachment point for the second torsion arm 703 is shown in FIGS. 10a and 10b to consist of a moulded part of the inside of the grip part 602. In order to save space at the bottom of the grip part it may be advantageous to implement the attachment point for the second torsion arm 703 in some other way, e.g. by providing an attachment point at one part of the connector 1001.

FIGS. 10a and 10b also show an exemplary embodiment for the one-sided releasing switch. At one side surface of the grip part 602 there is a pivoted lever 1004 one end of which constitutes the visible and actuatable release key 1005 while the other end 1006 protrudes into the inside of the grip part. In the retracted configuration said other end locks into a first recess 1007 in the body part 601, thus preventing the torsion spring 700 from ejecting the body part into the extended configuration. Pressing the release key end 1005 of the pivoted lever 1004 lifts the protruding end 1006 from the recess 1007, allowing free longitudinal movement of the body part 601. In the extended configuration the protruding end 1006 locks into a second recess 1008 in the body part 601. If two releasing switch should be used, it is easy to arrange for a similar lever and recess arrangement on the other side of the telephone apparatus.

Next we will describe an advantageous way of damping the mechanical movement of the body part in relation to the grip part. FIG. 11a is an exploded view of a simple mechanical damper, and FIG. 11b illustrates the same mechanical damper in assembled configuration. The damper structure consists of a gear wheel 1101, an axle 1102, an O-ring 1103, a housing 1104, a rotor 1105 and a cap 1106. The gear wheel 1101 and the rotor 1105 are non-rotatably attached to opposite ends of the axle 1102. The axle may comprise portions with a non-circular (e.g. square) cross-section at its ends to facilitate the non-rotatable attachment. The axle 1102 goes through a central hole in one end face of the housing 1104 so that the rotor 1105 is located on the concave side of the housing 1104. The O-ring 1103 seals said central hole against essentially all leakage. Together with the cap 1106 the concave side of the housing 1104 defines an enclosure which is filled with a viscous damper fluid. Various kinds of damper fluids are known, including such the viscosity of which is a function of a magnetic field. The invention does not limit the selection of the damper fluid. The operation of the damper of FIGS. 11a and 11b is based on the simple fact that when the gear wheel 1101, axle 1102 and rotor 1105 rotate together, the friction caused by the damper fluid tends to slow down the rotational movement.

A clockwork spring can be integrated to form a common structure with a damper which is generally of the type described above. FIGS. 12a and 12b illustrate a combined spring and damper structure where, in addition to the gear wheel 1101 and rotor 1105, the axle 1202 is mechanically coupled to the inner end of a clockwork spring 1203. A clockwork spring is a spirally wound piece of spring steel wire or other suitably resilient material. A front cap 1204 and the walls of a doubly concave housing 1205 enclose the middle part of the axle 1202 together with the clockwork spring 1203 into an enclosure. The outer end of the clockwork spring 1203 is attached to a point of the walls of said enclosure. The O-ring 1103, rotor 1105 and rear cap 1106 as well as the concave rear side of the housing 1205 serve similar functions as in FIGS. 11a and 11b. Directional terms like "front" and "rear" are only meant to refer schematically to the drawings and they do not limit the manufacture or use of any of the disclosed structures.

FIGS. 13a and 13b illustrate a variation of the structure of FIGS. 12a and 12b. Here only the front side of the housing 1303 is concave, there is only the front cap 1204, and both the clockwork spring 1203 and the rotor 1105 are enclosed in the common enclosure defined by the walls of the housing 1303 and the front cap 1204. A front O-ring 1301 seals the hole in the front cap 1204. In the embodiment of FIGS. 13a and 13b both the clockwork spring 1203 and the rotor 1105 will be immersed in the damper fluid. If the damping of the longitudinal movement is not regarded as necessary, like e.g. in a low-end version of the extendable telephone apparatus product, it is possible to simplify the structure of FIGS. 13a and 13b by leaving out the damper rotor 1105, the O-ring 1301 and the damper fluid.

The friction caused by the damper fluid may even be large enough for implementing the damper arrangement as in FIGS. 13c and 13d. Here the structure is otherwise similar to that in FIGS. 13a and 13b, but there is no damper rotor. The clockwork spring 1203 will be immersed in the damper fluid and fulfill also the tasks of the rotor.

Figure 14A:
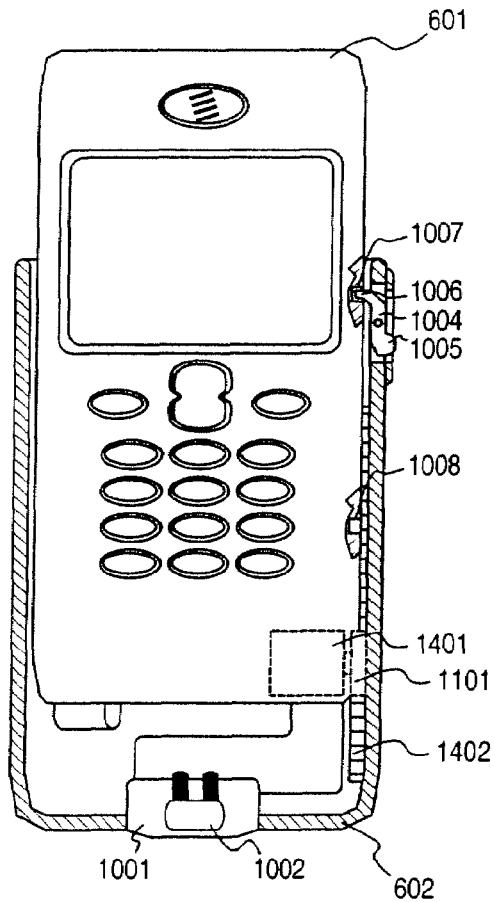
Figure 14B:
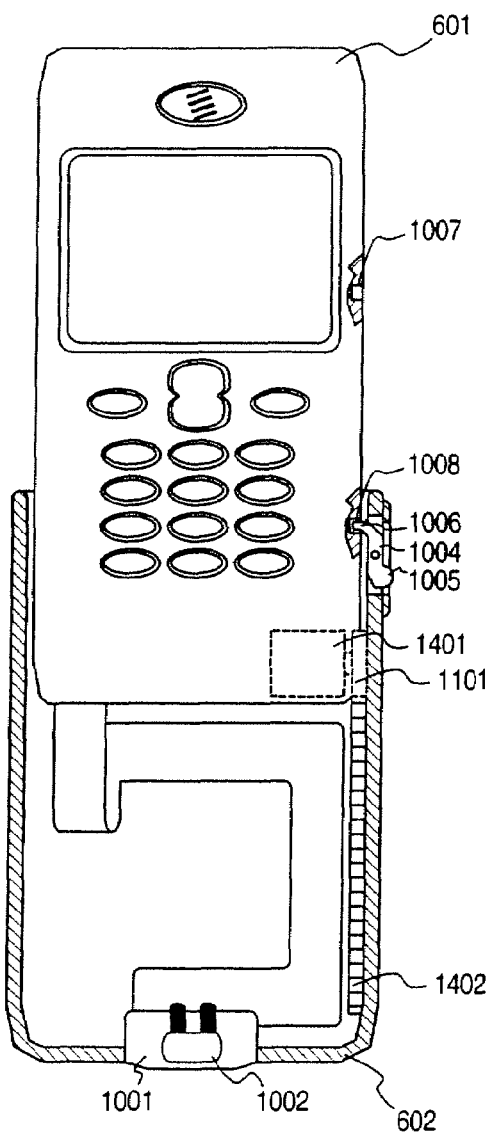

FIGS. 14a and 14b show how a combined clockwork spring and damper arrangement can be used to implement both the effecting and damping of the longitudinal movement of the body part 601 in relation to the grip part 602 between the retracted and extended configurations. A housing 1401 is located within the body part near the lower end thereof; the housing is of the type 1205 or 1303 shown in FIGS. 12a and 12b, 13a and 13b or 13c and 13d so that it comprises therein both a damper rotor and a clockwork spring arrangement (not shown in FIGS. 14a and 14b). A gear wheel 1101 is mechanically coupled to the damper rotor and clockwork spring arrangement. The housing and gear wheel may be at least partly hidden inside the outer cover of the body part 601 and correspondingly are drawn with dashed outline. A cogged rack 1402 is attached to the inside of the grip part 602 so that it lies parallel to the direction of the longitudinal movement of the body part 601 in relation to the grip part 602 between the retracted and extended configurations. The placement of the housing 1401 and gear wheel 1101 within the body part is such that the teeth of the gear wheel 1101 engage with those of the cogged rack 1402. The attaching of the ends of the clockwork spring inside the housing 1401 is made so that in the retracted position of FIG. 14a the spring is wound into an excited state. When the locking arrangement consisting of parts 1004, 1005, 1006 and 1007 is released, the spring starts unwinding. The resulting damped rotational movement of the gear wheel 1101 and the mechanical engagement of the gear wheel 1101 with the cogged rack 1402 cause the body part 601 and grip part 602 to be smoothly pushed into the extended configuration. When a user pushes manually the parts back into the retracted configuration, he simultaneously re-excites the clockwork spring so that it is ready for the next spring-forced extending of the telephone apparatus.

If the housing 1401 is of the simplified type of that shown in FIGS. 13a and 13b, that is, without the damper function, the embodiment of FIGS. 14a and 14b functions otherwise in a manner equal to that described above but without the smoothing of the longitudinal movement.

Only one combined clockwork spring and damper arrangement is shown in FIGS. 14a and 14b to implement the effecting and damping of the longitudinal movement of the body part 601 in relation to the grip part 602 between the retracted and extended configurations. In order to ensure good linearity for the movement it may be necessary to use two such arrangements so that one clockwork spring and damper arrangement with their associated cogged racks is located on each side of the structure consisting of the body part and the grip part.

Figure 16A:
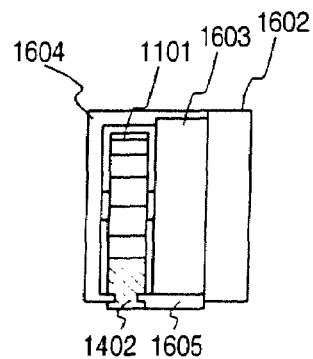
FIGS. 16*a* and 16*b* illustrate an embodiment of securing a gear wheel onto a rack and FIGS. 17*a* and 17*b* illustrate another embodiment of securing a gear wheel onto a rack.
Figure 16B:
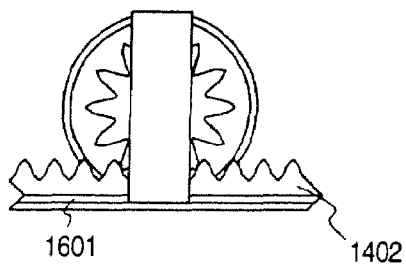
Figure 15A:
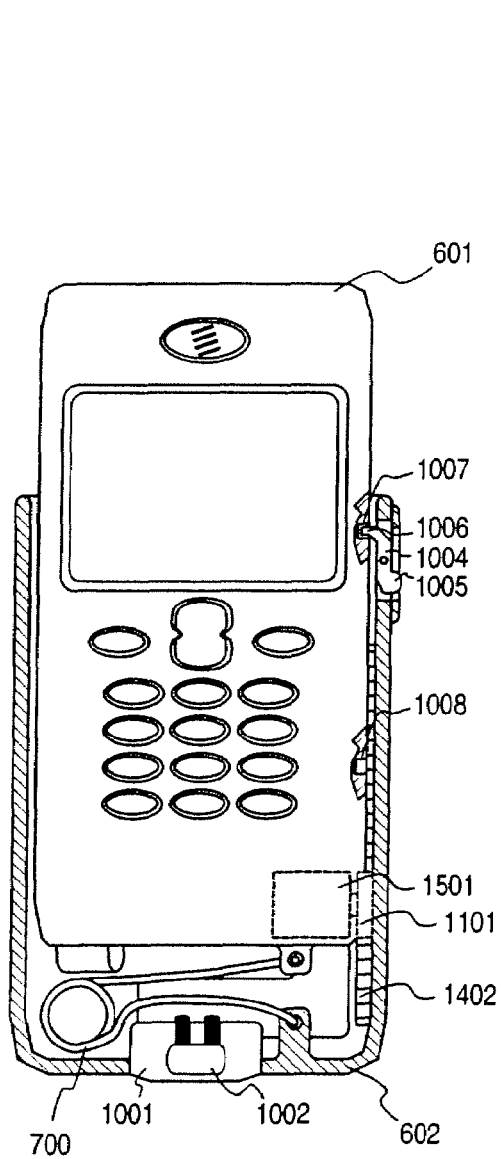
Figure 15B:
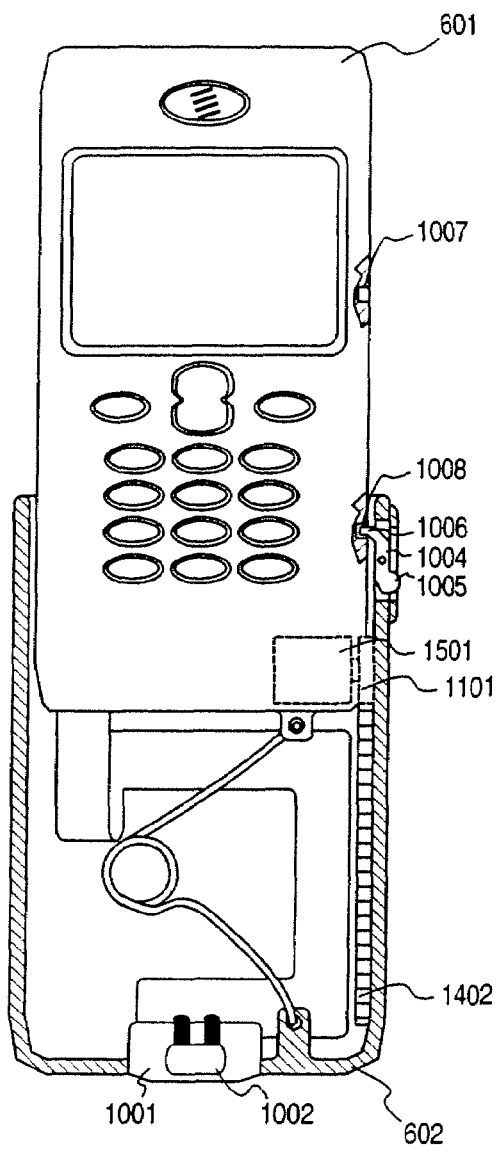

FIGS. 15a and 15b illustrate a hybrid arrangement where the body part 601 again comprises a housing 1104, but this time the housing only comprises a damper rotor immersed in a viscous damper fluid (not shown). In other words, the housing 1104 is generally of the type shown in FIGS. 11a and 11b. There is a gear wheel 1101 which is mechanically coupled to the damper rotor, and a cogged rack 1402 which constitutes a part of the grip part 602 and is mechanically engaged with the gear wheel 1101. However, the purpose of the damper, gear wheel and cogged rack arrangement is only to damp the longitudinal movement of the body part 601 in relation to the grip part 602 between the retracted and extended configurations. The spring force for the effecting of the movement comes from a torsion spring 700 as in the embodiment of FIGS. 10a and 10b. FIGS. 16a and 16b illustrate an advantageous way of securing the engagement of a gear wheel 1101 with a cogged rack 1402. The cogged rack 1402 comprises a pair of longitudinal grooves 1601 along its sides. Attached to the housing which here consists of a spring barrel 1602 and a damper chamber 1603 (in a different mutual order than in the alternative arrangements described before) there are an outer sliding support 1604 and an inner sliding support 1605 the ends of which extend into said grooves. During the rolling longitudinal movement of the gear wheel 1101 along the rack 1402 the sliding supports 1604 and 1605 slide in the grooves 1601 but prevent any vertical or transversal movements of the gear wheel which could cause slipping. If the transversal movements of the gear wheel can be eliminated to an adequate extent with e.g. making the other parts of the extending mechanism sturdy enough, it is possible to use only one groove and only one sliding support to eliminate vertical movements.

Figure 17A:
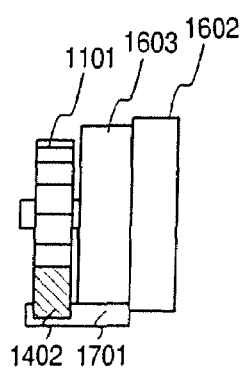
Figure 17B:
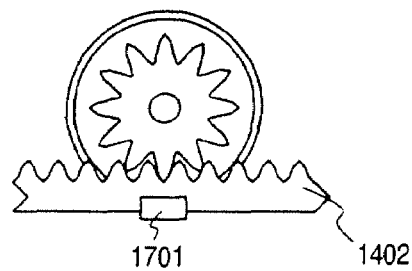

FIGS. 17a and 17b illustrate an alternative arrangement where the cogged rack 1402 need not to comprise any grooves. Instead of any outer and inner sliding supports there is a cradle 1701 attached to the housing. The cradle 1701 goes under the rack 1402 and comprises inner and outer edges that together define a groove where the rack may slide back and forth when the gear wheel rotates. The edges of this groove again prevent any vertical or transversal movements of the gear wheel 1101 in relation to the rack 1402.

Again, if the damper function is not required, the arrangements of FIGS. 16a to 17b may be simplified by removing the damper chamber 1603 altogether.

The mechanical implementation of the rack 1402 deserves some further consideration. In the embodiments described above the placement of the rack on one hand and the damper, spring and gear wheel on the other hand is such that the rack constitutes a part of the grip part and the damper, spring and gear wheel arrangement (or only the damper and gear wheel arrangement, or only the spring and gear wheel arrangement) is located within the body part. This is advantageous e.g. from an aesthetical viewpoint, because the rack 1402 is relatively long in the direction of movement between the retracted configuration and the extended configuration, so placing it into the body part would almost inevitably result in part of the rack becoming visible to the user in the extended configuration. However, the invention is not limiting in this respect: the roles of the body part and the grip part in relation to the rack and damper, spring and gear wheel arrangement may well be exchanged. If the rack, however, is a part of the grip part it is advantageous from the manufacturing viewpoint if manufacturing the rack and attaching it to the grip part require as little extra steps in manufacturing as possible. If the grip part or an inner part thereof is made of plastics by injection moulding, it is possible to make the rack to appear in the mould so that the rack is produced simultaneously with the rest of the structure with no extra work required at all.

The above-described specific embodiments of the invention should not be construed to place limitations to the scope of the appended claims. For example, also other kinds of springs may be used than just those described above. The features recited in the depending claims are freely combinable unless otherwise explicitly stated.

The invention claimed is:

1. A telephone apparatus, comprising:
   a body part constructed to house at least a portion of said telephone apparatus,
   a grip part adapted to be held by a user during use and constructed to support said body part for longitudinal movement of said body part on said grip part, between a retracted position and an extended position,
   an actuator mechanism coupled between said grip part and said body part for effecting the longitudinal movement of said body part relative to said grip part between said retracted position and said extended position,
   a locking mechanism for detachably locking the body part into the grip part in the retracted position and
   a user-actuatable release mechanism mounted in the grip part for releasing the locking mechanism, wherein, in said extended use position, the telephone apparatus is adapted to be held by the user by grasping the grip part and holding the telephone apparatus such that longitudinal movement of the body part moves said body part upwards from a retracted position to an extended position where said body part is above said grip part.

2. A telephone apparatus according to claim 1, wherein the grip part comprises a first side surface and a second surface for holding the telephone apparatus by one hand so that one side surface rests against the thumb and palm and the tips of the other fingers rest on the other side surface, and the release mechanism is located on one of said side surfaces.

3. A telephone apparatus according to claim 2, comprising two release mechanisms located on the opposite side surfaces.

4. A telephone apparatus according to claim 3, wherein said two release mechanisms are coupled so that actuating either one of them alone suffices to release the locking mechanism.

5. A telephone apparatus according to claim 3, wherein said two release mechanisms are not coupled so that only actuating both of them simultaneously suffices to release the locking mechanism.

6. A telephone apparatus according to claim 1, comprising flexible conductor means having a first point, a second point and between said first point and said second point an elongated portion, wherein said first point is attached to the grip part, said second point is attached to the body part and said elongated portion is free of attachments to the body part or the grip part.

7. A telephone apparatus according to claim 6, wherein said flexible conductor means is a flat cable.

8. A telephone apparatus according to claim 6, wherein said flexible conductor means is a flexible printed circuit board.

9. A telephone apparatus according to claim 8, wherein the grip part comprises a connector for providing an electrical interface to the telephone apparatus, wherein said connector is electrically connected to said flexible printed circuit board.

10. A telephone apparatus according to claim 9, wherein said flexible printed circuit board has the shape of a P where the lower end of the loop in the P is not connected to the vertical shaft of the P, so that
    said connector is connected to the lower end of the loop in the P,
    the loop in the P is attached to a flat surface at the inside of the grip part,
    said first point is at the upper end of the vertical shaft of the P,
    said second point is at the lower end of the vertical shaft of the P and
    the vertical shaft of the P is bent essentially 180 degrees around a fictitious axis which is perpendicular to the vertical shaft of the P to define a rounded section between said first point and said second point.

11. A telephone apparatus according to claim 9, wherein the grip part comprises a microphone that is electrically connected to said flexible printed circuit board through a connecting arrangement in said connector.

12. A telephone apparatus according to claim 8, wherein the grip part comprises a microphone that is electrically connected directly to said flexible printed circuit board.

13. A telephone apparatus according to claim 1, wherein the movement-effecting mechanism comprises a torsion spring having a helically wound cylindrical portion, a first torsion arm and a second torsion arm, of which said first torsion arm is mechanically coupled to the body part, said second torsion arm is mechanically coupled to the grip part, and said cylindrical portion, said first torsion arm and said second torsion arm are all located within an essentially closed space defined by the sleeve-like form of the grip part.

14. A telephone apparatus according to claim 1, wherein the movement-effecting mechanism comprises a spiral spring, a first reaction arm and a second reaction arm, of which said first reaction arm is mechanically coupled to the body part, said second reaction arm is mechanically coupled to the grip part, one end of said spiral spring is attached to said first reaction arm, one end of said spiral spring is attached to said second reaction arm, and said spiral spring, said first reaction arm and said second reaction arm are all located within an essentially closed space defined by the sleeve-like form of the grip part.

15. A telephone apparatus according to claim 1, comprising a damper arrangement for smoothing the longitudinal movement.

16. A telephone apparatus according to claim 15, wherein said damper arrangement comprises:
    a cogged rack extending in the direction of the longitudinal movement,
    an axle,
    a gear wheel mounted non-rotatably on said axle and engaged with said rack for longitudinal rolling movement in the extending direction of said rack,
    a damper housing arranged to define a closed damper chamber,
    viscous damper fluid within said damper chamber and
    a damper rotor mounted non-rotatably on said axle and enclosed into said damper chamber;

of which said rack and said damper housing are located within different ones of the body part and the grip part.

17. A telephone apparatus according to claim 16, comprising a support arrangement so that:
said support arrangement is mechanically fixedly coupled to said damper housing,
said support arrangement is movably coupled to said rack for longitudinal movement of said rack in relation to said support arrangement and
said support arrangement comprises a vertically limiting part for preventing the vertical movement of said rack in relation to said support arrangement.

18. A telephone apparatus according to claim 17, wherein said support arrangement additionally comprises a transversally limiting part for preventing the transversal movement of said rack in relation to said support arrangement.

19. A telephone apparatus according to claim 1, wherein the movement-effecting mechanism comprises:
a cogged rack extending in the direction of the longitudinal movement,
an axle,
a gear wheel mounted non-rotatably on said axle and engaged with said rack for longitudinal rolling movement in the extending direction of said rack, and
a clockwork spring located coaxially with said axle and having a first end and a second end, of which said first end is attached to said axle and said second end is attached to a part in relation to which said axle is rotatable;
of which said rack and said axle are located within different ones of the body part and the grip part.

20. A telephone apparatus according to claim 18, comprising a damper arrangement for smoothing the longitudinal movement, and comprising within said damper arrangement:
a damper housing arranged to define a closed damper chamber and
viscous damper fluid within said damper chamber;
so that said axle protrudes into said damper chamber.

21. A telephone apparatus according to claim 19, comprising a damper rotor mounted non-rotatably on said axle and enclosed into said damper chamber.

22. A telephone apparatus according to claim 21, wherein said clockwork spring is located in said damper chamber together with said damper rotor, and said second end of said clockwork spring is attached to said damper housing.

23. A telephone apparatus according to claim 21, wherein said damper housing additionally defines a spring chamber so that said clockwork spring is located in said spring chamber and said second end of said clockwork spring is attached to said damper housing.

24. A telephone apparatus according to claim 21, comprising a spring housing which is different than said damper housing, wherein:
said spring housing is mechanically fixedly coupled to said damper housing,
said spring housing defines a spring chamber,
said clockwork spring is located in said spring chamber and said second end of said clockwork spring is attached to said spring housing.

25. A telephone apparatus according to claim 19, wherein the movement-effecting mechanism comprises:
a first cogged rack extending in the direction of the longitudinal movement,
a first axle,
a first gear wheel mounted non-rotatably on said first axle and engaged with said first rack for longitudinal rolling movement in the extending direction of said first rack,
a first clockwork spring located coaxially with said first axle and having a first end and a second end, of which said first end is attached to said first axle and said second end is attached to a part in relation to which said first axle is rotatable,
a second cogged rack extending in the direction of the longitudinal movement,
a second axle,
a second gear wheel mounted non-rotatably on said second axle and engaged with said second rack for longitudinal rolling movement in the extending direction of said second rack and
a second clockwork spring located coaxially with said second axle and having a first end and a second end, of which said first end is attached to said second axle and said second end is attached to a part in relation to which said second axle is rotatable;
of which said first rack and said first axle are located within different ones of the body part and the grip part, and said second rack and said second axle are located within different ones of the body part and the grip part.

26. A telephone apparatus according to claim 1, wherein the movement-effecting mechanism comprises an electric motor.

27. A telephone apparatus according to claim 1, wherein the movement-effecting mechanism comprises a pair of oppositely oriented magnets located within different ones of the body part and the grip part.

28. A telephone apparatus according to claim 1, wherein the body part forms a housing within which a majority of electrically functional parts of the telephone apparatus are mounted, and the grip part comprises surfaces configured for a single-hand grip for a human user holding the telephone apparatus in a conventional operational position of a telephone.

29. A telephone according to claim 1, wherein said telephone includes a display mounted in said body part.

30. A telephone according to claim 1, wherein said telephone includes an antenna, for receiving and transmitting radio signals, mounted on said body part.

31. A telephone according to claim 29 wherein said telephone further includes a loudspeaker mounted on said body part.

* * * * *